United States Patent
Wada

(10) Patent No.: US 7,061,547 B2
(45) Date of Patent: Jun. 13, 2006

(54) IMAGE DISPLAYING SYSTEM OF ENVIRONMENT-ADAPTIVE TYPE, IMAGE PROCESSING METHOD AND PROGRAM

(75) Inventor: Osamu Wada, Ima (JP)

(73) Assignee: Seiko Epson Corporation, Tokyo (JP)

(*) Notice: Subject to any disclaimer, the term of this patent is extended or adjusted under 35 U.S.C. 154(b) by 956 days.

(21) Appl. No.: 10/031,441

(22) PCT Filed: May 22, 2001

(86) PCT No.: PCT/JP01/04254

§ 371 (c)(1),
(2), (4) Date: Jan. 22, 2002

(87) PCT Pub. No.: WO01/91099

PCT Pub. Date: Nov. 29, 2001

(65) Prior Publication Data

US 2003/0007098 A1    Jan. 9, 2003

(30) Foreign Application Priority Data

May 25, 2000    (JP)    ............................. 2000-154074

(51) Int. Cl.
H04N 5/58    (2006.01)
H04N 9/64    (2006.01)

(52) U.S. Cl. .................. 348/602; 348/603; 348/650; 348/227.1; 348/14.07; 348/358; 348/518; 348/382; 348/167

(58) Field of Classification Search ............... 348/603, 348/602, 650, 655, 658, 223.1, 227.1, 14.07, 348/14.12, 14.1; 382/162, 167, 276; 345/589, 345/591; 358/518, 516, 514

See application file for complete search history.

(56) References Cited

U.S. PATENT DOCUMENTS 6,628,822 B1 *  9/2003  Nakabayashi et al. ...... 382/162
6,912,306 B1 *  6/2005  Nakabayashi et al. ...... 382/167

FOREIGN PATENT DOCUMENTS

| JP | A 9-98301 | 4/1997 |
| JP | A 9-107484 | 4/1997 |
| JP | A 10-65930 | 3/1998 |

(Continued)

OTHER PUBLICATIONS

U.S. Appl. No. 10/019,698, filed Jan. 2, 2002, Wada.

Primary Examiner—Michael Lee
Assistant Examiner—Jean W. Désir
(74) Attorney, Agent, or Firm—Oliff & Berridge PLC

(57) ABSTRACT

An environment-compliant image display system, image processing method and information storage medium which can reproduce the same colors at different locations by absorbing any difference in the visual environment. In an individual environment, an image data is generated by absorbing any difference between a reference environment and the individual visual environment by a colored light information processing section 140, based on X, Y and Z values of an image in an image display area measured by a colored light sensor 60 as well as X, Y and Z values measured in the reference environment. A profile for projector input/output is corrected by a profile managing section 130 and then an image is projected by using an L/V drive section 190.

4 Claims, 16 Drawing Sheets

FOREIGN PATENT DOCUMENTS

| | | |
|---|---|---|
| JP | A 10-105145 | 4/1998 |
| JP | A 10-224646 | 8/1998 |
| JP | A 10-304395 | 11/1998 |
| JP | A 11-032228 | 2/1999 |
| JP | A 11-75072 | 3/1999 |
| JP | A 11-85952 | 3/1999 |
| JP | A 11-175048 | 7/1999 |
| JP | A 11-276441 | 10/1999 |

* cited by examiner

IMAGE DISPLAYING SYSTEM OF ENVIRONMENT-ADAPTIVE TYPE, IMAGE PROCESSING METHOD AND PROGRAM

TECHNICAL FIELD

The present invention relates to an environment-compliant image display system, image processing method and program.

BACKGROUND ART

There has been provided an environment-compliant image processor which can regulate a color to be displayed depending on an ambient light.

Such a conventional environment-compliant image processor is compliant with the environment, but not in consideration of use in the network environment.

For example, in a network conference between meeting rooms A and B, the same image data may provide images of different colors to the meeting rooms A and B, respectively.

Particularly, in a field requiring high-precision display of image such as an image processing field or a medical field, it is extremely important that the color of an image displayed at a certain location can be regulated to be identical with the color of another image displayed at a reference location or that the colors of images displayed at different locations can be unified into the same color.

A presentation will be degraded if the color of an image displayed at a certain location is different from those of images displayed at other different locations.

DISCLOSURE OF THE INVENTION

The present invention may provide an environment-compliant image display system, image processing method and program which can reproduce substantially the same color over different locations.

(1) The present invention relates to an environment-compliant image display system having a plurality of image display devices which are disposed at different locations and display substantially the same image when an object is displayed by the image display devices, each of the image display devices comprising:

correction means which corrects input/output characteristic data for display used by display means in each of the image display devices to represent ideal image colors, based on visual environment information which indicates visual environment of an image display area.

(2) The present invention relates to an environment-compliant image processing method for representing substantially the same color at different locations, the method comprising the steps of:

grasping visual environments of an image display area in each of the different locations; and correcting colors of an image displayed at each of the different locations based on visual environment information indicating the grasped visual environment.

(3) The present invention relates to a program embodied on an information storage medium or in a carrier wave for displaying substantially the same image at different locations, the program causing a computer to implement:

input means which inputs visual environment information indicating visual environment of an image display area; and correction means which corrects input/output characteristic data for display used by display means to represent ideal image colors, based on the inputted visual environment information.

(4) The present invention relates to a computer-usable information storage medium comprising a program for implementing the above-described means.

According to the present invention, by correcting the input/output characteristic data of the image display devices disposed at different locations, images can be displayed with substantially the same colors at different locations to represent ideal image colors.

This makes it possible to accurately reproduce an intended view of an image at different locations, so that effective presentation can be simultaneously performed at different locations, for example.

(5) The present invention also relates to an environment-compliant image display system having a plurality of image display devices which are disposed at different locations and display substantially the same image when an object is displayed by the image display devices, one of the image display devices comprising:

transmission means which transmits image information for representing an ideal image to the other of the image display devices through a transmission path; and correction means which corrects input/output characteristic data for display used by display means in each of the image display devices to represent ideal image colors, based on the image information and visual environment information which indicates visual environment of an image display area in a disposed location, wherein the other of the image display devices has:

reception means which receives the image information from the one of the image display devices through the transmission path; and another correction means which corrects the input/output characteristic data for display used by the display means in each of the image display devices to represent ideal image colors, based on the received image information and the visual environment information which indicates the visual environment of an image display area in a disposed location.

(6) The above described program or information storage medium may further cause the computer to implement:

reception means which makes a reception device receive image data for display from a predetermined processing device; and means which makes a display device display an image based on the received image data and input/output characteristic data corrected by the correction means.

According to the present invention, by correcting the input/output characteristic data of the image display devices disposed at different locations, images can be displayed with substantially the same colors at different locations to represent ideal image colors.

Particularly, an intended view of an image can accurately be reproduced at different locations by receiving the image information and displaying the image in real time, even if data of the original image is frequently updated.

(7) The present invention further relates to an environment-compliant image display system having a plurality of image display devices which are provided at different locations and display an image compliant with visual environment of a specific location in each of the different locations, each of the image display devices comprising:

transmission means which transmits reference visual environment information of the specific location to the other image display devices disposed at locations different from the specific location through a transmission path, when the image display device is disposed at the specific location;

reception means which receives the reference visual environment information through the transmission path, when image display device is disposed at a location different from the specific location; and correction means which corrects input/output characteristic data for display used by display means in each of the image display devices to display an image compliant with the visual environment of the specific location, based on the received reference visual environment information and individual visual environment information of a disposed location when the image display device is disposed at a location different from the specific location.

(8) The present invention further relates to an environment-compliant image processing method for representing substantially the same colors as an image displayed at a reference location, the method comprising:

a reference image display step of displaying an image at the reference location; and an individual image display step of displaying an image at a location different from the reference location, wherein the reference image display step includes:

a step of grasping visual environment of the reference location; and a transmission step of transmitting reference visual environment information indicating the grasped visual environment to a location different from the reference location through a transmission path, and wherein the individual image display step includes:

a step of grasping the visual environment of a location different from the reference location;

a reception step of receiving the reference visual environment information; and a correction step of correcting colors of an image, based on the received reference visual environment and individual visual environment information indicating the grasped visual environment.

(9) The present invention also relates to a program embodied on an information storage medium or in a carrier wave, using a plurality of image display devices provided at different locations to display an image compliant with visual environment of a specific location at each of the different locations, the program causing a computer to implement:

means which makes transmission means transmit reference visual environment information of the specific location to part of the image display devices disposed at locations different from the specific location through a transmission path, when the computer is disposed at the specific location;

means which makes reception means receive the reference visual environment information through the transmission path, when the computer is disposed at a location different from the specific location; and correction means which corrects input/output characteristic data for display used by display means in each of the image display devices to display an image compliant with the visual environment of the specific location, based on the received reference visual environment information and individual visual environment information of a disposed location of the computer when the computer is disposed at a location different from the specific location.

(10) The present invention also relates to a computer-usable information storage medium comprising a program for implementing the above-described means.

(11) The present invention further relates to an environment-compliant image display system having a plurality of image display devices which are provided at different locations and display an image compliant with visual environment of a specific location in each of the different locations, an image display device of the plurality of the image display devices disposed at a location different from the specific location comprising:

reception means which receives reference visual environment information of the specific location transmitted from the specific location; and correction means which corrects input/output characteristic data for display used by display means in each of the image display devices to display an image compliant with the visual environment information of the specific location, based on the received reference visual environment information and individual visual environment information of a disposed location.

(12) The present invention further relates to a program embodied on an information storage medium or in a carrier wave, using a plurality of image display devices provided at different locations to display an image compliant with visual environment of a specific location at each of the different locations, the program causing a computer to implement;

means which makes reception means receive reference visual environment information of the specific location transmitted from the specific location; and correction means which corrects input/output characteristic data for display used by display means in each of the image display devices to display an image compliant with the visual environment information of the specific location, based on the received reference visual environment information and individual visual environment information of a disposed location of the image display device different from the specific location.

(13) The present invention further relates to a computer-usable information storage medium containing a program for implementing above-described means.

According to the present invention, since an image compliant with the visual environment of a reference location can be reproduced at the other locations, images having substantially the same color can be displayed at different locations.

Particularly, since an actual image view displayed at the reference location can be reproduced at the other locations, an intended view of an image can accurately be reproduced at the different locations.

(14) The image display system may further comprise grasp means which grasps the visual environment.

(15) In the image display system, the grasp means may measure at least one of color value, gamma and color temperature of a displayed image.

(16) In the above-described image processing method, at least one of color value, gamma and color temperature of a displayed image may be grasped in the grasp step of grasping the visual environment.

(17) In the program and the information storage medium, the visual environment may be grasped by grasp means which measures at least one of the color value, gamma and color temperature of a displayed image.

By measuring at least one of the color value, gamma and color temperature of the displayed image, the visual environment can properly be grasped.

Note that the visual environment grasp means may be measuring means which measures the color value, gamma, color temperature and others of XYZ or RGB of the displayed image, for example.

The gamma is a gradient in a photoelectric transfer characteristic curve at a certain point. Therefore, by grasping the gamma, the difference between the standard photoelectric transfer characteristic curve and the photoelectric transfer characteristic curve under the actual visual environment can be found. Thus, colors can be corrected based on the difference.

The color temperature is the temperature at which a blackbody emits light of the same color as a given object. The color temperature almost depends on the display device. If an image display area of the display device receives an external light, however, the color temperature may be varied. Therefore, by grasping the color temperature in the actual visual environment, influence of the external light or the like can be grasped to properly correct colors.

The color value may be XYZ value, RGB value or L*a*b* value (hereinafter simply referred to as "Lab").

(18) In the above image display system, the displayed image may be an image for presentation, and each of the image display devices may be a projector type of display device which projects an image for presentation.

When presentation is performed at different locations, substantially the same colors can be reproduced. This makes it possible to almost simultaneously reproduce the colors intended by a presenter at different locations, enabling effective presentation.

(19) In the above-described image processing method, the correction step may include a step of correcting input/output characteristic data for display.

By correcting the input/output characteristic data to vary the voltage outputted in response to an input or other factors, displayed colors can be regulated.

In addition, gamma correction may be carried out as the correction of input/output characteristic data.

BEST MODE FOR CARRYING OUT THE INVENTION

The present invention will now be described with reference to the drawings in connection with a network meeting system which displays an image through a liquid-crystal projector, to which the present invention is applied.

1. System Layout

Figure 1:
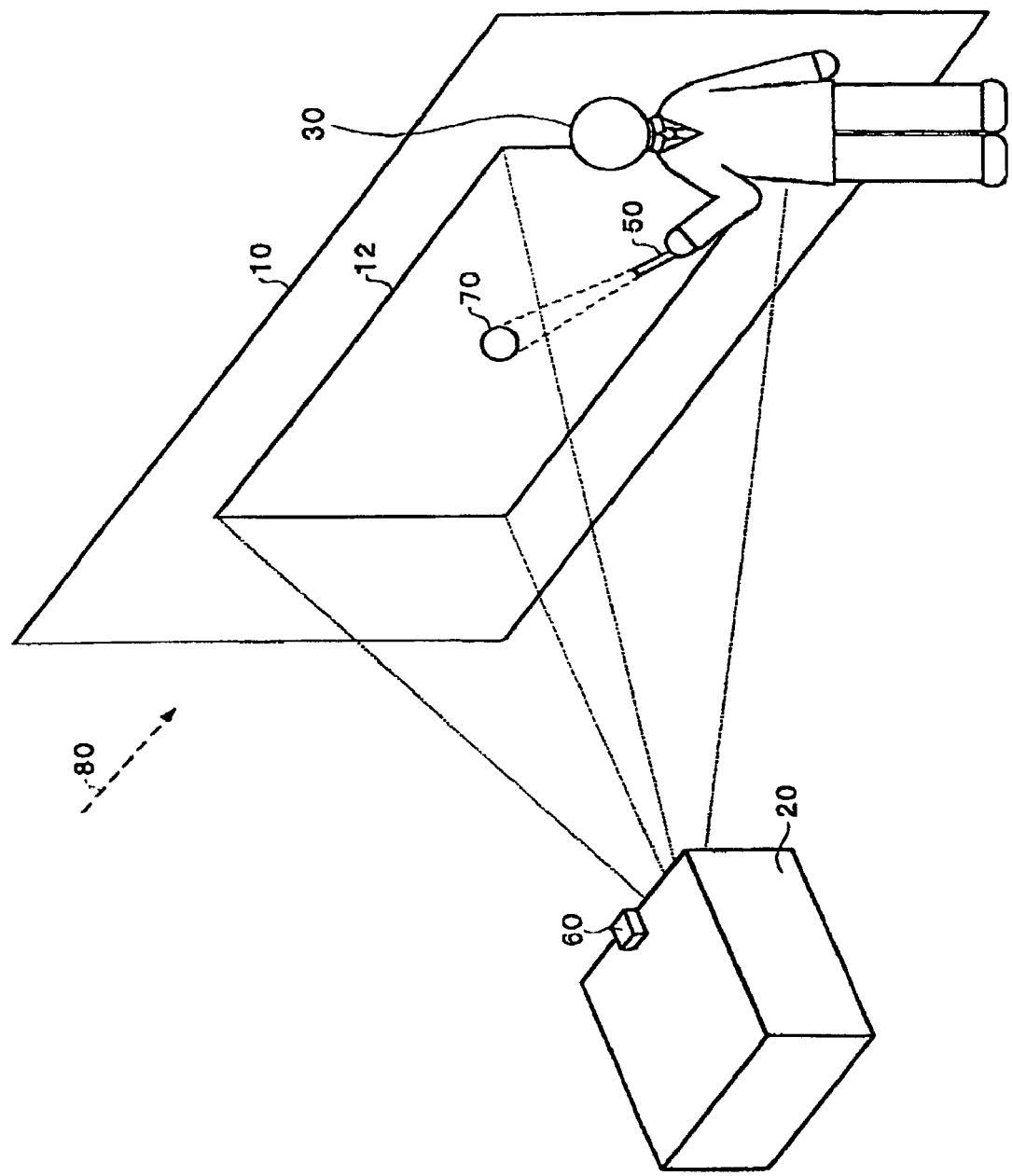
FIG. 1 is a schematic diagram showing a network meeting system in which a laser pointer is used, according to one embodiment of the present invention.

FIG. 1 is a schematic diagram illustrating a network meeting system using a laser pointer 50, which is constructed according to one embodiment of the present invention.

A projector 20 is disposed substantially in front of a screen 10 and projects a predetermined presentation image onto the screen. A presenter 30 performs a presentation relative to meeting attendees while pointing a desired location in an image display area 12 on the screen 10 using a spot light 70 which is projected from the laser pointer 50.

In such a presentation, the display of the image display area 12 is highly variable depending on the type of the screen 10 or the ambient light 80. For example, the same white color may differently be viewed to be yellowish white or to be bluish white, depending on the type of the screen 10. Furthermore, the same white color may differently be viewed to be bright white or to be dark white, depending on the ambient light 80.

In recent years, the internet or other network systems have developed to enable the high-speed data communication. Therefore, a presentation image may be displayed in a plurality of meeting rooms at the same time.

For the network meeting in the fields of image processing, medical service and so on, very precise display of image is required. For example, in a remote imaging diagnostic technology system, an image from a medical camera such as gastrocamera or the like may be observed not only in a diagnostic location but also in a remote location. If the color of the image is invariable between the diagnostic and remote locations, the same diagnosis can smoothly be carried out at both the diagnostic and remote locations.

In such a case, an original image in a meeting room must be transmitted to the other meeting room(s), rather than an image taken by a video camera or the like. It is thus extremely important that the color of the image intended by the presenter 30 can accurately be reproduced at different locations.

Figure 2:
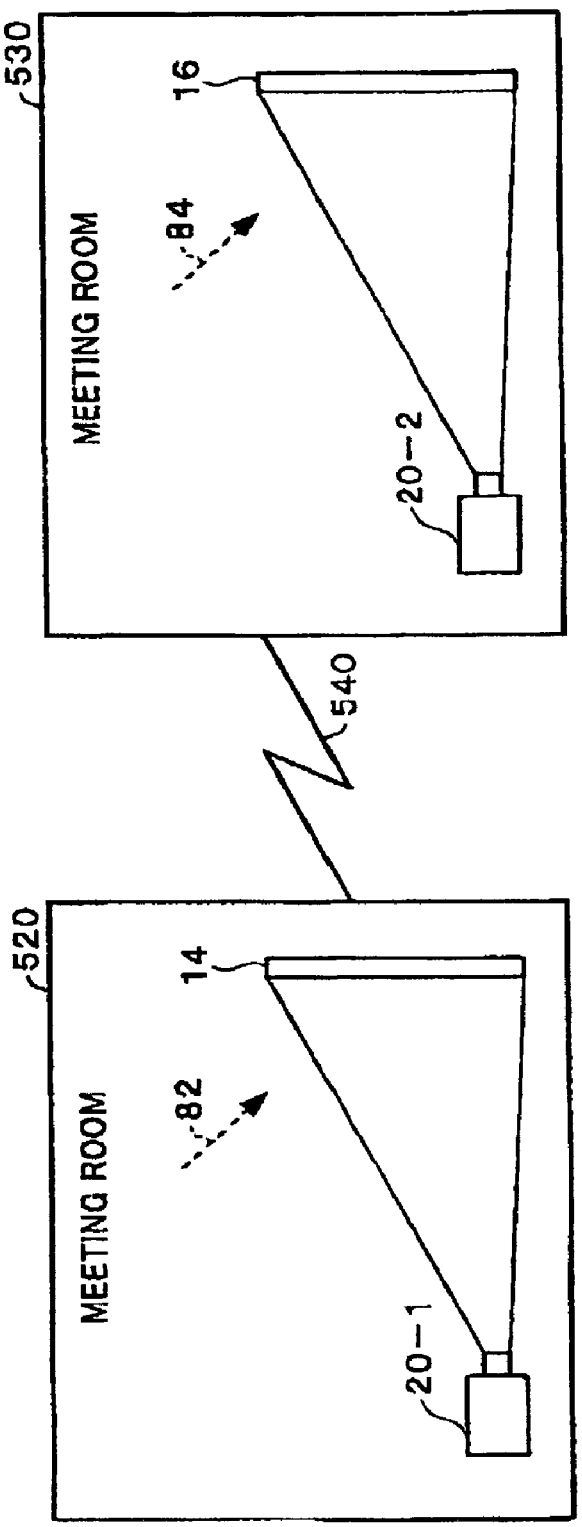
FIG. 2 is a schematic diagram showing a network meeting system for a plurality of meeting rooms.

FIG. 2 is a schematic diagram illustrating a network meeting system containing a plurality of meeting locations.

In a meeting room 520 in which the presenter 30 is performing the presentation, for example, an image based on an original image data is projected onto a dedicated screen 14 through a projector 20-1 in a visual environment in which the ambient light 82 is provided by a fluorescent light.

The projector 201-1 in the meeting room 520 then transmits the original image data to another projector 20-2 in another meeting room 530 through a dedicated transmission path 54.

The projector 20-2 projects and displays an image based on the received original image data onto a screen 16 formed by a material different from that of the screen 14 in a visual environment in which the other different ambient light 84 is provided by both a fluorescent light and an external light.

Even though the image is regulated in the meeting room 520, the display of the image may vary in the other meeting room 530 if the image is displayed as it is. This may hinder the communication between the meeting attendees or may not provide the desired presentation.

Since the prior art did not consider the influence of the external light (or ambient light) or screen material as described, it was impossible to provide the same display of image at different locations.

Figure 3:
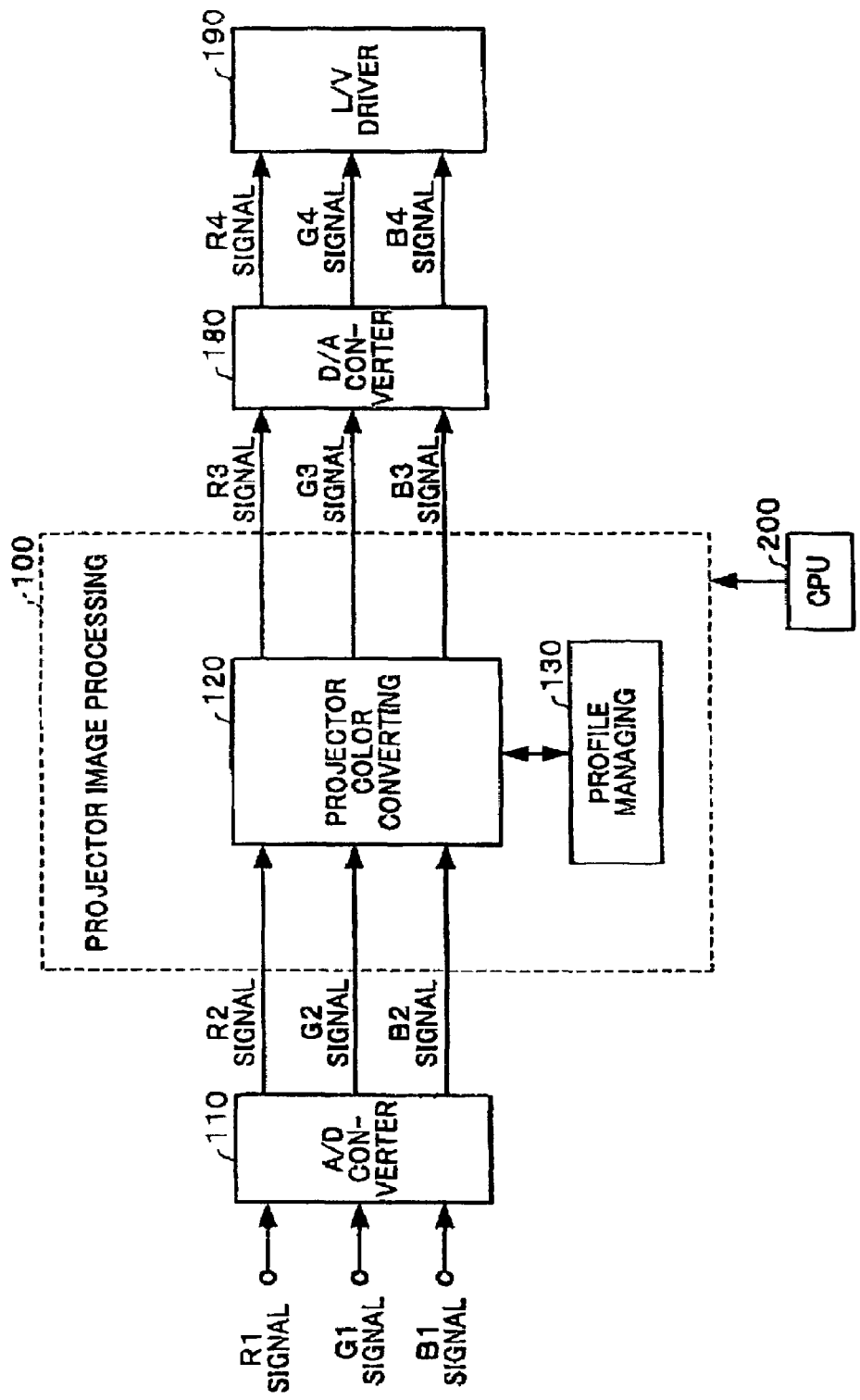
FIG. 3 is a functional block diagram of an image processing section of a conventional projector.

FIG. 3 is a functional block diagram of an image processing unit in a projector according to the prior art.

The prior art projector receives R1, G1 and B1 signals forming an analog RGB signal from PC or the like and inputs them into an A/D converter 110. A projector image processing section 100 performs the color conversion of digital R2, G2 and B2 signals which have been converted by the A/D converter 110.

A D/A converter 180 converts R3, G3 and B3 signals subjected to the color conversion by the projector image processing section 100 into analog signals. An L/V (light valve) driver 190 drives a liquid crystal light valve to project and display an image, based on analog R4, G4 and B4 signals converted by the D/A converter 180.

The projector image processing section 100 is controlled by CPU 200 and comprises a projector color converting section 120 and a profile managing section 130.

The projector color converting section 120 converts the digital signals (R2, G2 and B2) from the A/D converter 110 into RGB digital signals (R3, G3 and B3) to be outputted from the projector, based on an input/output profile for the projector managed by the profile managing section 130. The profile means the characteristic data.

Thus, the prior art projector only performs the color conversion based on the input/output profile indicating the input/output characteristic inherent in the projector, but does not consider the visual environment in which the image is projected and displayed.

As described, however, it is difficult that the display of color is integrated without consideration of the visual environment. The display of color is determined by three factors, light, reflection or transmission of light on an object and visual sense.

This embodiment of the invention implements an image display system which can reproduce the same color at different locations by grasping the visual environment reflecting the difference of the color display depending on a matter to which the display is to be performed such as the ambient light or screen material and transmitting the original image data as well as the information indicating the visual environment as reference to an image display device at any location whereat the image is to be displayed.

More concrete techniques for realizing it include a technique of conforming the color of an image to be displayed at different locations to the ideal image color and another technique of conforming the color of an image to be displayed at different locations to the color of an image displayed at a reference location.

These techniques will sequentially be described below.

2. Technique of Conforming Colors of Images Displayed at Different Locations to Ideal Image Colors More particularly, as shown in FIG. 1, a colored light sensor 60 functioning as visual environment grasping means is provided. The colored light sensor 60 inputs the visual environment information into a projector 20. More particularly, the colored light sensor 60 measures XYZ values which are light reflection information in an image display area 12 on a screen 10.

The projector 20 comprises colored light information processing means for converting the visual environment information into coordinate values in a predetermined color space and also for determining coordinate values which form a complementary color pair for the converted coordinate values, based on coordinate values of a predetermined color in the predetermined color space in a predetermined reference environment as well as the converted coordinate values.

The protector 20 also comprises correction means for correcting display input/output characteristic data used by means for displaying the image, based on the determined coordinate values being complementary color pair.

The projector 20 further comprises means for receiving/transmitting the original image data and the reference visual environment information.

The image processing unit of the projector 20 including the colored light information processing means and other means will now be described.

Figure 4:
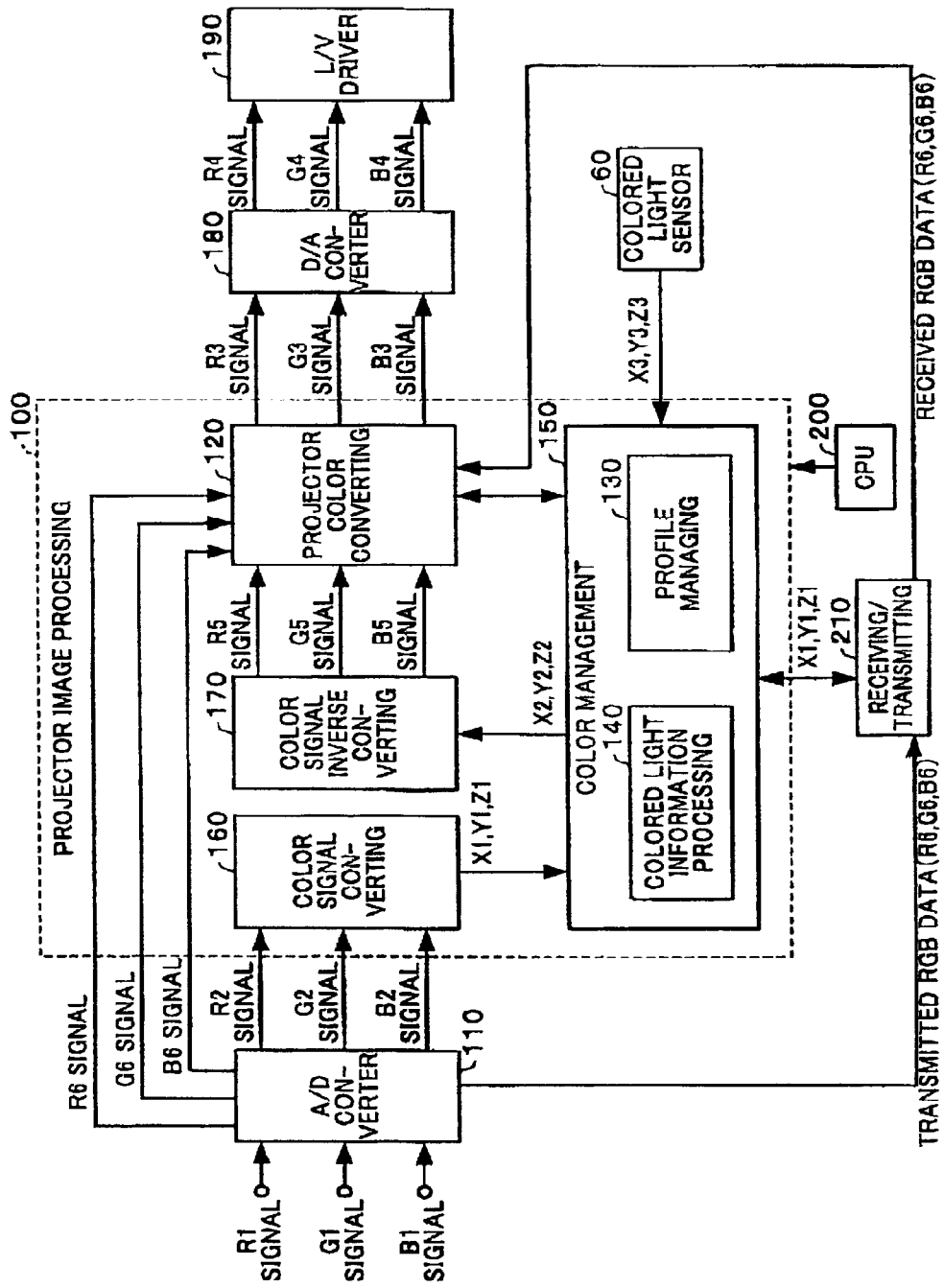
FIG. 4 is a functional block diagram of an image processing section in a projector according to one embodiment of the present invention.

FIG. 4 is a functional block diagram of the image processing unit in the projector 20 which is constructed according to one embodiment of the present invention.

The projector 20 inputs RGB analog signals R1, G1 and B1 from PC or the like to the A/D converter 110, and performs color conversion of digital signals R2, G2 and B2 by means of the projector image processing section 100.

The projector 20 inputs color-converted R3, G3 and B3 signals to a D/A converter 180, and also inputs analog-converted R4, G4 and B4 signals to an L/V (light valve) driver 190 to drive the liquid crystal light valve for projecting and displaying an image.

Such an arrangement is not different from that of the prior art projection. However, the projector 20 according to this embodiment comprises a projector image processing section 100 which comprises a color signal converting section 160, a color signal inverse converting section 170, a color management section 150, a projector color converting section 120 and a receiving/transmitting section 210.

The color signal converting section 160 converts RGB digital signals (R2, G2 and B2) from the A/D converter 110 into XYZ values (X1, Y1 and Z1). RGB signals are device dependence type colors which are variable depending on the input/output device such as projector 20 while XYZ values are device independence type colors which are invariable depending on the device.

A concrete technique of converting RGB digital signals into XYZ values may be one that performs the matrix conversion using 3×3 matrix.

The color signal converting section 160 outputs the converted XYZ values (X1, Y1 and Z1) toward the color management section 150.

The color management section 150 converts XYZ values (X1, Y1, Z1) inputted from the color signal converting section 160 into XYZ values (X2, Y2, Z2) which reflect the visual environment, based on measured values by the colored light sensor 60 as the visual environment grasp means.

The color management section 150 comprises a colored light information processing section 140 and a profile managing portion 130 for managing the input/output profile for the projector 20.

The colored light information processing section 140 converts a white color reflecting the actual visual environment information into coordinate values in the Lab space and determines coordinate values that form a complementary color pair for the converted coordinate values, based on coordinate values in the white Lab space in a predetermined reference environment as well as the converted coordinate values. The complementary color pair means a pair of colors which creates a gray color when these colors are mixed together.

The colored light information processing section 140 converts the XYZ values (X1, Y1 and Z1) inputted from the color signal converting section 160 into the other XYZ values (X2, Y2 and Z2) reflecting the visual environment, based on the measurements in the colored light sensor 60.

The profile managing portion 130 functions as the aforementioned correcting means and creates input/output profiles for the RGB signals in the projector 20. The profile managing portion 130 further manages the RGB input/output characteristics for the projector 20 using the created input/output profiles for the RGB signals.

The color signal inverse converting section 170 performs the matrix inverse conversion of the XYZ values (X1, Y2 and Z2) from the colored light information processing section 140 into RGB digital signals (R5, G5 and B5) using the aforementioned inverse matrix in the color signal converting section 160.

The projector color converting section 120 converts the RGB digital signals (R5, G5 and B5) from the color signal inverse converting section 170 into RGB digital signals (R3, G3 and B3) for projector output while referring the projector profile managed by the profile managing portion 130.

The projector image processing section 100 is controlled by CPU 200 and comprises a projector color converting section 120 and a profile managing portion 130.

The projector color converting section 120 converts RGB digital signals (R6, G6 and B6) from the A/D converter 110 into projector output RGB digital signals (R3, G3 and B3), based on the input/output profiles for the RGB signals managed by the profile managing portion 130.

The projector output RGB digital signals outputted from the projector color converting section 120 are then converted into RGB analog signals (R4, G4 and B4) by the D/A converter 180. The L/V driver 190 then uses the RGB analog signals to drive the liquid crystal light valve for projecting and displaying the image.

In such a manner, the projector 20 of this embodiment projects and displays the image taking the visual environment into consideration.

Namely, the projector 20 can display an image accommodating to the environment on display by correcting the display input/output characteristic data used by the image display means based on the coordinate values reflecting the environment information and the coordinate values of complementary color pair. Thus, the projector 20 can absorb any difference in the display environment and display the same image without depending on the applied environment.

This embodiment also considers the use of the projector 20 in the network.

For such a purpose, the projector 20 may include the receiving/transmitting section 210.

When the projector 20 is disposed at the reference location and if the receiving/transmitting section 210 functions as receiving/transmitting means, the receiving/transmitting section 210 sends the image data (X1, Y1 and Z1) indicating the ideal image color to be displayed on calibration (or correction) toward the other projectors 20. When the presentation is carried out, the receiving/transmitting section 210 also transmits a presentation image represented by RGB data (R6, G6 and B6) digital-converted by the A/D converter 110 toward the other projectors 20.

If a projector 20 is disposed at a location different from the reference location, the receiving/transmitting section 210 thereof functions as receiver means for receiving the image data on calibration and also for receiving the transmitted RGB data (R6, G6 and B6) on presentation, from a receiving/transmitting section 210 in another projector 20 disposed at the reference environment location.

On calibration, the projector 20 disposed at a location different from the reference environment location corrects the image color so that it will coincide with the color of the ideal image data (X1, Y1 and Z1) by correcting the color space and input/output profiles based on the image data (X1, Y1 and Z1) received by the receiving/transmitting section 210 and XYZ values (X3, Y3 and Z3) measured by the colored light sensor 60 at that location.

The projector 20 inputs the RGB data (R6, G6 and B6) received by the receiving/transmitting section 210 into the projector color converting section 120 for projecting and displaying the presentation image.

In such an arrangement, substantially the same color can simultaneously be reproduced at different locations by regulating the image color so that it will coincide with the ideal color of the image data (X1, Y1 and Z1).

In connection with the actual presentation, how the aforementioned color management section 150 and others function will be described using flowcharts.

Figure 5:
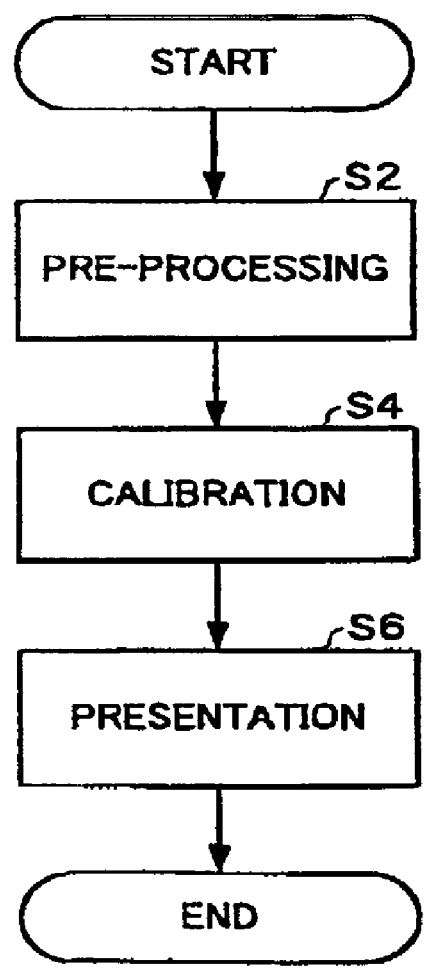
FIG. 5 is a flowchart illustrating the entire presentation according to one embodiment of the present invention.

FIG. 5 is a flowchart illustrating the entire presentation according to one embodiment of the present invention.

It is assumed herein that the same presentation image is simultaneously display by a plurality of projectors 20 which are disposed at different locations.

First of all, the profile managing portion 130 performs the pre-processing such as preparation of the input/output profiles or the like (step S2).

The calibration (or correction) is then performed to do the regulation corresponding to visual environments by projecting white-color images from each of the projectors 20 to the corresponding screen 10 by a predetermined gradation unit depending on the visual environments of the respective locations (step S4).

After calibration, a presentation is carried out (step S6).

The procedures of the pre-processing (step S2) to the presentation (step S6) will sequentially be described in more detail.

Figure 6:
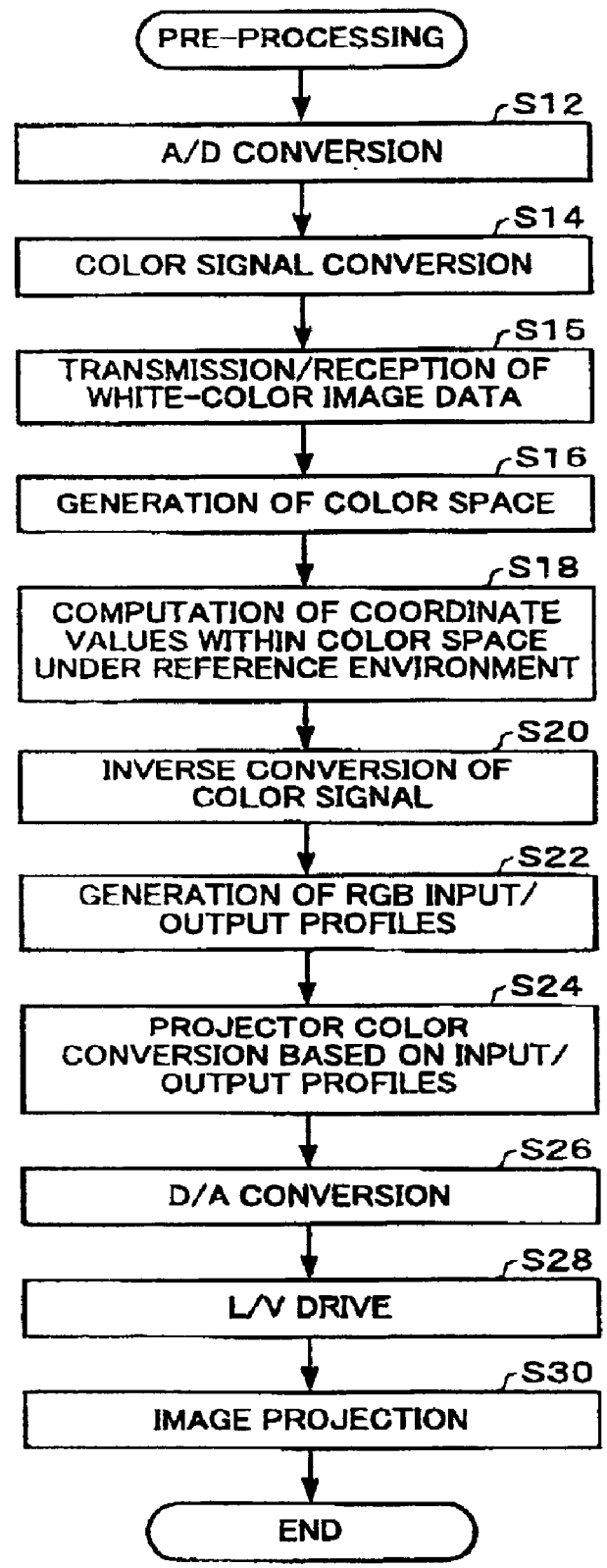
FIG. 6 is a flowchart illustrating the preprocessing according to one embodiment of the present invention.

FIG. 6 is a flowchart illustrating the pre-processing according to one embodiment of the present invention.

In the pre-processing (step S2), the A/D converter 110 first converts analog signals (R1, G1 and B1) of a reference white-color image for pre-processing into digital signals (R2, G2 and B2) (step S12).

The color signal converting section 160 then converts the digital signals into XYZ values (X1, Y1 and Z1) indicating the ideal color and outputs them toward the color management section 150 (step S14).

The projector 20-1 on the transmitter side transmits the white-color data (X1, Y1 and Z1) indicating the ideal color toward the projector 20-2 on the receiver side (step S15).

Both the projectors 20-1 and 20-2 respectively in the reference and non-reference environments perform a calibration, which will be described, so that values (X3, Y3 and Z3) measured by the respective colored light sensors 60 will be this white-color image data (X1, Y1 and Z1).

The colored light information processing section 140 in the color management section 150 generates a color space (or Lab space) based on the XYZ values (X1, Y1 and Z1) (step S16). The colored light information processing section 140 then determines the coordinate values of the white-color image in the color space (step S18).

The colored light information processing section 140 further converts the XYZ values (X1, Y1 and Z1) into other XYZ values (X2, Y2 and Z2) reflecting the visual environment. At this step, however, the visual environment information is still not inputted. Therefore, the XYZ values (X1, Y1 and Z1) are equal to the XYZ values (X2, Y2 and Z2), respectively.

The color signal inverse converting section 170 performs the inverse matrix conversion of the XYZ values (X2, Y2 and Z2) from the colored light information processing section 140 into digital RGB signals (R5, G5 and B5) using the inverse matrix in the aforementioned color signal converting section 160 (step S20).

On the other hand, the profile managing portion 130 creates the input/output profiles of the RGB signals in the projectors 20 based on the coordinate values of the white-color image generated by the colored light information processing section 140 (step S22). Thus, the input/output profiles of the RGB signals corresponding to the respective projectors 20 disposed at various different locations will be prepared.

The projector color converting section 120 converts the digital RGB signals (R5, G5 and B5) from the color signal inverse converting section 170 into digital RGB signals (R3, G3 and B3) which are to be outputted through the projectors, based on the prepared input/output profiles (step S24).

The D/A converter 180 converts the projector output digital RGB signals outputted from the projector color converting section 120 into analog RGB signals (R4, G4 and B4) (step S26).

The L/V driver 190 drives the liquid crystal light valve based on the analog RGB signals (step S28) and projects and displays the white-color image (step S30).

In the pre-processing (step S2), thus, the projectors 20 disposed at the respective locations create the color spaces, the coordinate values in the respective color spaces under the reference environment and the input/output profiles of the RGB signals in the projectors 20.

The calibration (step S4) will now be described.

Figure 7:
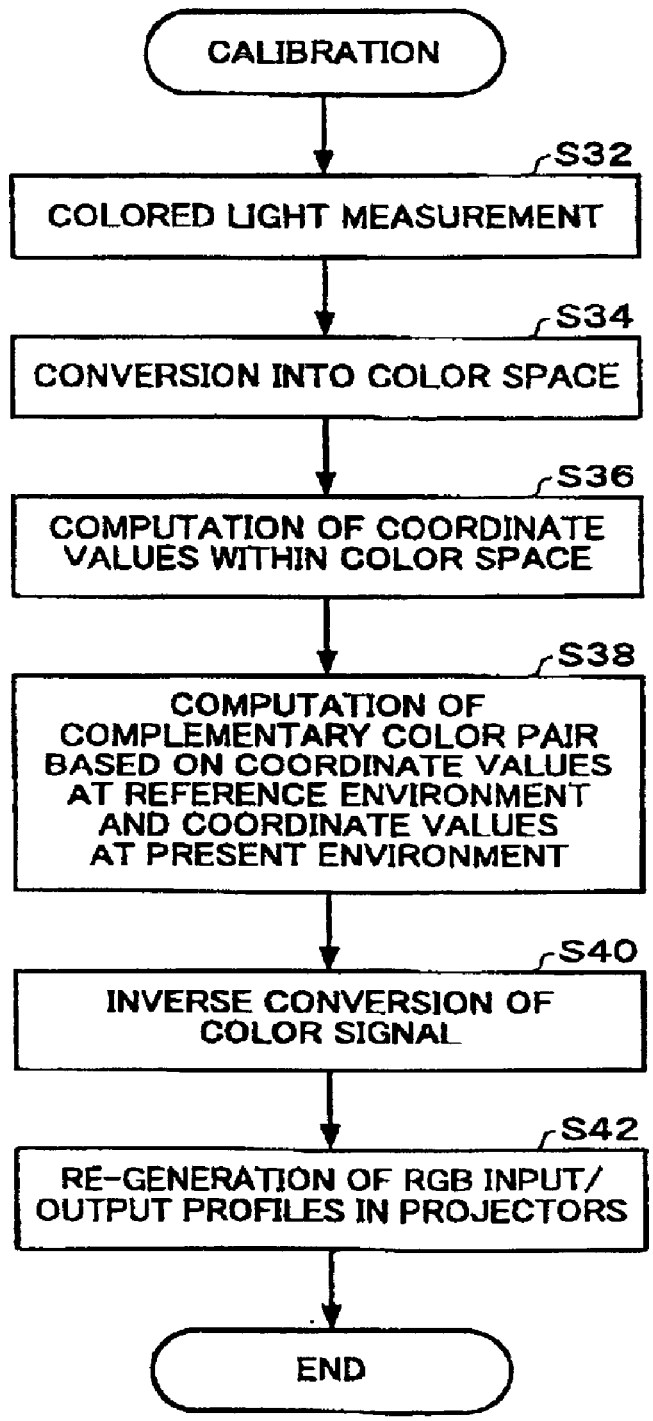
FIG. 7 is a flowchart illustrating the calibration according to one embodiment of the present invention.

FIG. 7 is a flowchart illustrating the calibration according to one embodiment of the present invention.

A presenter 30 performs the calibration before the presentation image is actually displayed at different locations.

In the calibration (step S4), first of all, the projector 20 projects and displays the white-color image used in the pre-processing (step S2) onto the corresponding screen 10 to grasp the visual environment in the image display area at a location whereat this projector 20 is disposed. Under such a situation, the colored light sensor 60 measures the XYZ values (X3, Y3 and Z3) in the image display area 12 on which the white-color image is displayed (step S32).

The colored light information processing section 140 then computes and determines coordinate values within the color space (or Lab space) based on the measurements in the colored light sensor 60 (step S36).

The colored light information processing section 140 then computes and determines coordinate values of complementary color pair, based on the coordinate values at the reference environment determined at the step S18 as well as the coordinate values in the actual visual environment (step S38).

The technique of determining the coordinate values of complementary color pair at this time may be one that determines is the inverse vector of a bound vector indicating the positions of the white-color coordinate values in the color space under the actual presentation environment, for example.

Figure 10:
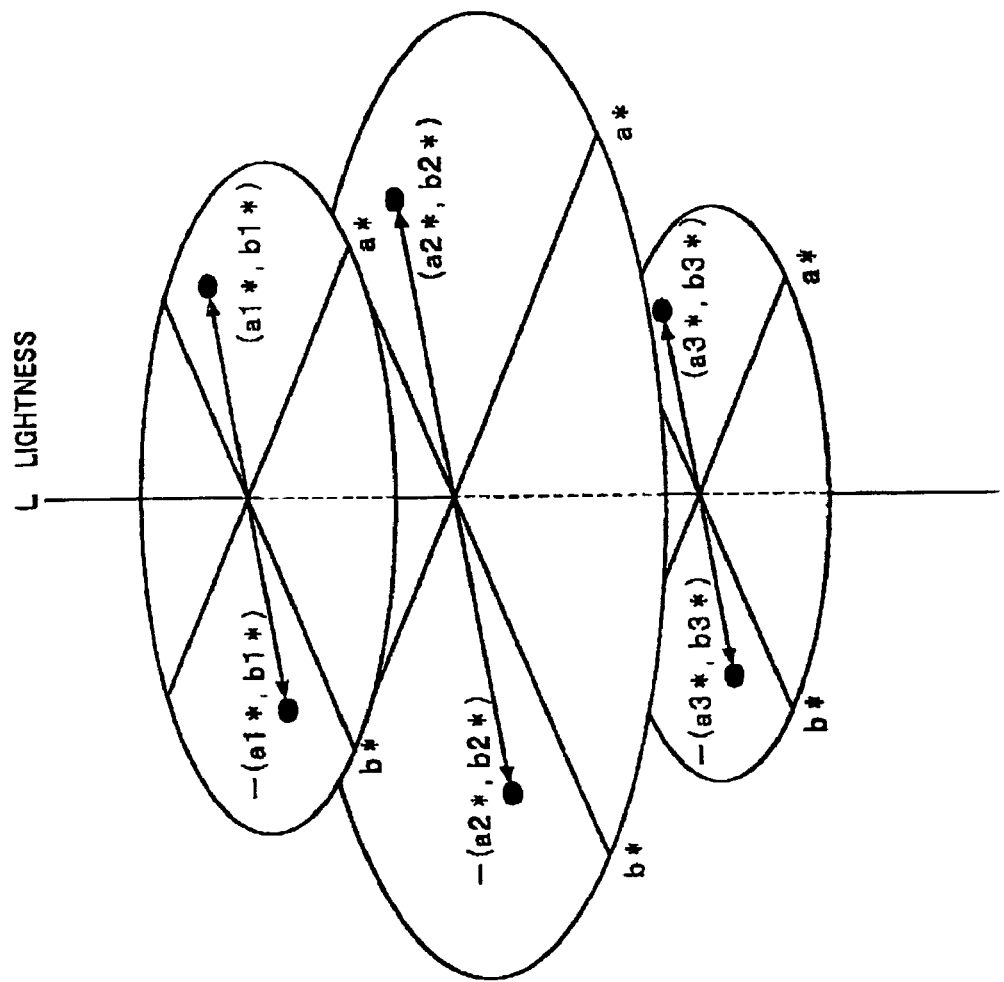
FIG. 10 is a schematic diagram showing the concept of inverse vector in the Lab space.

FIG. 10 is a schematic diagram showing the concept of inverse vector in the Lab space.

As shown in FIG. 10, the Lab space includes a vertical axis representing the lightness L and a plurality of a*-b* planes along the L axis. It is now assumed that the coordinate values of the white-color values in the actual presentation environment were (a1*, b1*) in a predetermined a*-b* plane.

In this case, the coordinate values (a1*, b1*) can be grasped as the origin in the a*-b* plane or a bound vector at a point whereat the a*-b* plane intersects the L axis. The term "vector" herein means one having a magnitude and an orientation.

By determining the inverse vector of the bound vector, the coordinate values (−a1*, −b1*) of complementary color pair relative to the coordinate values (a1*, b1*).

In other words, the white color is at a point on the L axis in the reference environment, but offset from the origin on the L axis by the coordinate values (a1*, b1*) in the actual environment.

Therefore, the profile managing portion 130 corrects the color by this inverse vector. Thus, the coordinate values of the white color measured in the actual environment will be on the L axis, such that the color of the actually displayed image will substantially coincide with the ideal XYZ values (X1, Y1 and Z1).

The colored light information processing section 140 further outputs XYZ values (X2, Y2 and Z2) obtained by correcting the XYZ values (X1, Y1 and Z2), based on the coordinate values of complementary color pair.

The color signal inverse converting section 170 matrix-inverse converts the XYZ values (X2, Y2 and Z2) from the colored light information processing section 140 into digital RGB signals (R5, G5 and B5) (step S40).

The profile managing portion 130 re-prepares the previously prepared input/output profiles of RGB signals, based on the coordinate values of complementary color pair (step S42).

Actually, the white-color image is displayed in each of the a*-b* planes existing on the L axis or by each of predetermined gradations, the displayed image being measured in XYZ values to correct the color.

Each of the input/output profiles is actually used for gamma correction.

Figure 11A:
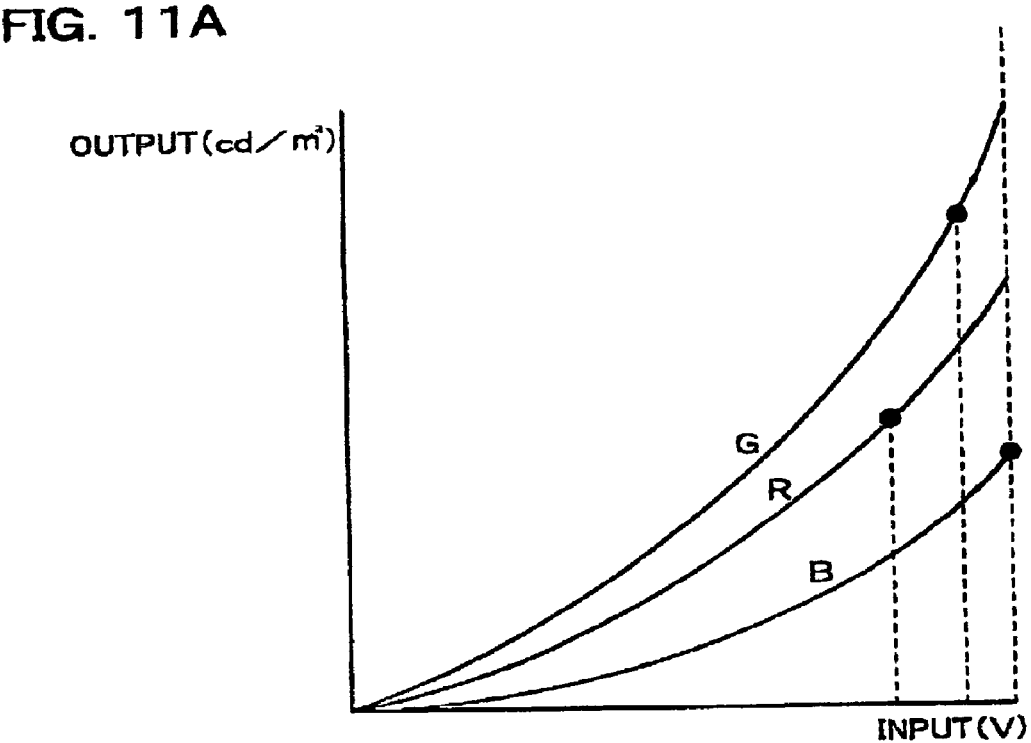
FIG. 11A is a graph showing the relationship between input and output in RGB input/output characteristic before gamma correction.

FIG. 11A shows the relationship between the input and output in the RGB input/output characteristics before gamma correction. As shown in FIG. 11A, each of the RGB signals increases as the voltage (or input (V) value) increases and as the lightness (or output ($cd/m^2$)) increases.

FIG. 11A also shows the RGB input/output characteristic relating to the ideal light. Thus, each of the projectors 20 can use the colored light information from the colored light sensor 60 to obtain the ideal white color through the RGB input/output characteristic having no black spot (•) under the ideal environment which will not be influenced by the ambient light or screen material.

However, the colored light information of the projector 20 is frequently influenced by the ambient light or screen material. In the form of FIG. 11A, the color is reproduced on the screen 10 while being strictly influenced by R and G if the projector 20 is not corrected relating to the white color.

In such a state, even the ideal white color outputted from the projector 20 is reproduced to be yellowish on the screen 10. To correct the influence of the ambient light or screen material included in the colored light information of the projector 20, the input/output signals of R and G among the three input/output signals RGB maybe reduced, as shown by black spots. dependent on their corrected amount to correct the yellowish white color into the ideal white-colored light outputted from the projector 20.

Figure 11B:
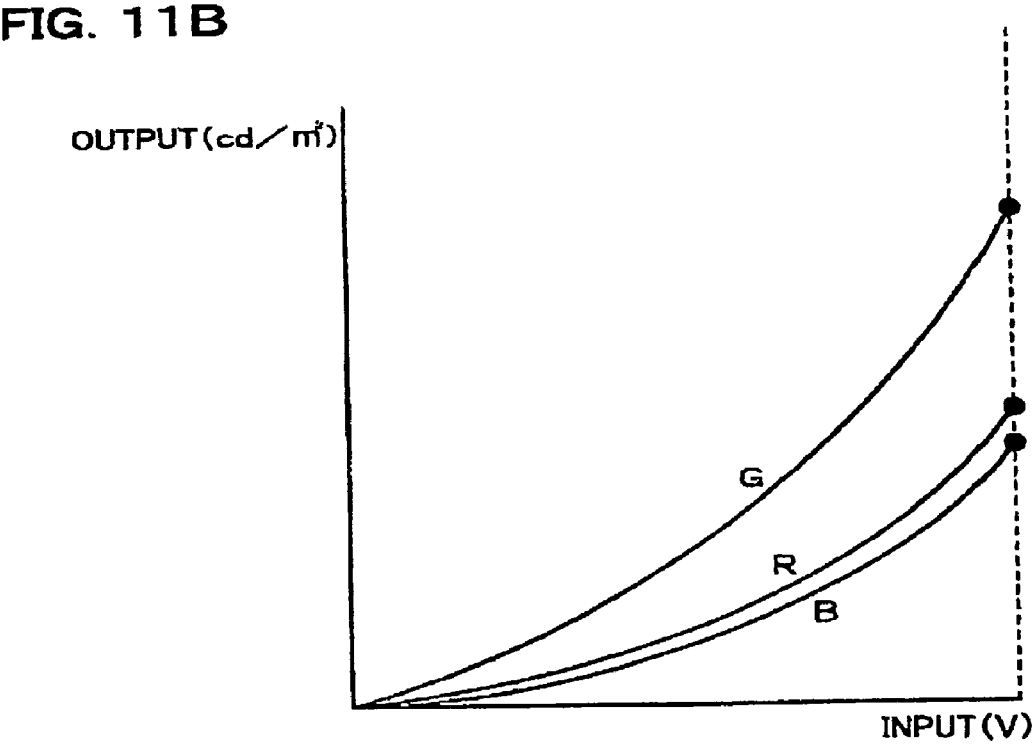
FIG. 11B is a graph showing the relationship between input and output in RGB input/output characteristic after gamma correction.

FIG. 11B shows R and G curves re-prepared by shifting the black spots directly to the maximum axis (or dotted line in FIG. 11A). R, G and B curves in the input/output signal characteristics after correction relating to RGB gradations in FIG. 10B are determined from the following formulas (1) to (3). Correction coefficients KR, KG and KB are determined from the following formulas (4) to (6)

$$R \text{ signal (bit)} = KR \times \text{input signal before correction} \quad (1)$$

$$G \text{ signal (bit)} = KG \times \text{input signal before correction} \quad (2)$$

$$B \text{ signal (bit)} = KB \times \text{input signal before correction} \quad (3)$$

$$KR = \text{maximum } R \text{ input value after correction}/255 \quad (4)$$

$$KG = \text{maximum } G \text{ input value after correction}/255 \quad (5)$$

$$KB = \text{maximum } B \text{ input value after correction}/255 \quad (6)$$

Figure 13:
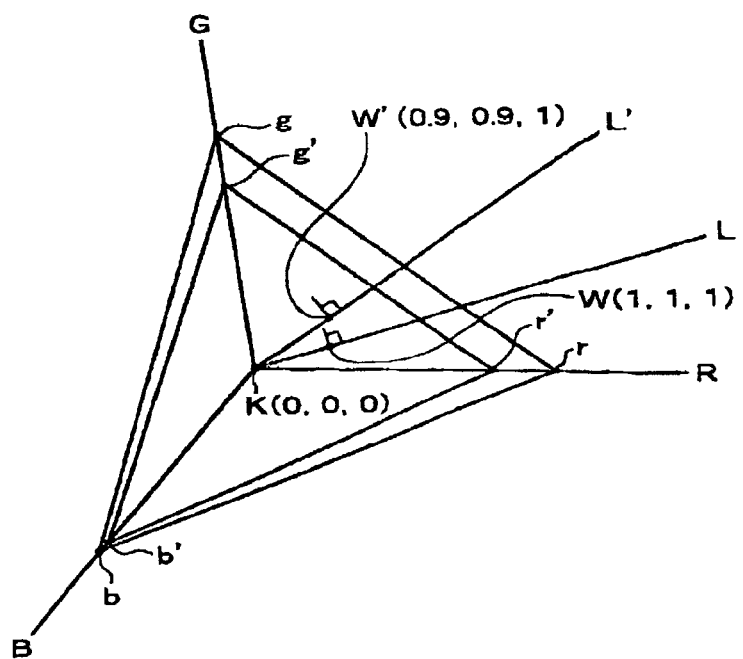
FIG. 13 is a schematic diagram showing RGB color triangles before and after correction.

FIG. 13 is a schematic diagram showing RGB color triangle before and after correction.

In the color triangle rgb before correction, a point K (0, 0, 0) or a point whereat the lightness L axis passing through black intersects the color triangle rgb is at W (1, 1, 1) or white.

By performing the aforementioned inverse vector correction relative to the whole color triangle rgb, the latter may be a color triangle r'g'b'. In the color triangle r'g'b', a point or white whereat the lightness L axis passing through black intersects the color triangle r'g'b' is W' (0.9, 0.9, 1) which is slightly nearer K (0, 0, 0) than the color triangle rgb.

As described, the calibration (step S4) prepares the profiles in the actual applied environment to perform the gamma correction properly. Thus, each of the projectors 20 at different locations can reproduce the image color substantially coinciding with the ideal color (X1, Y1 and Z1).

The actual presentation (step S6) after such a calibration will be described.

Figure 8:
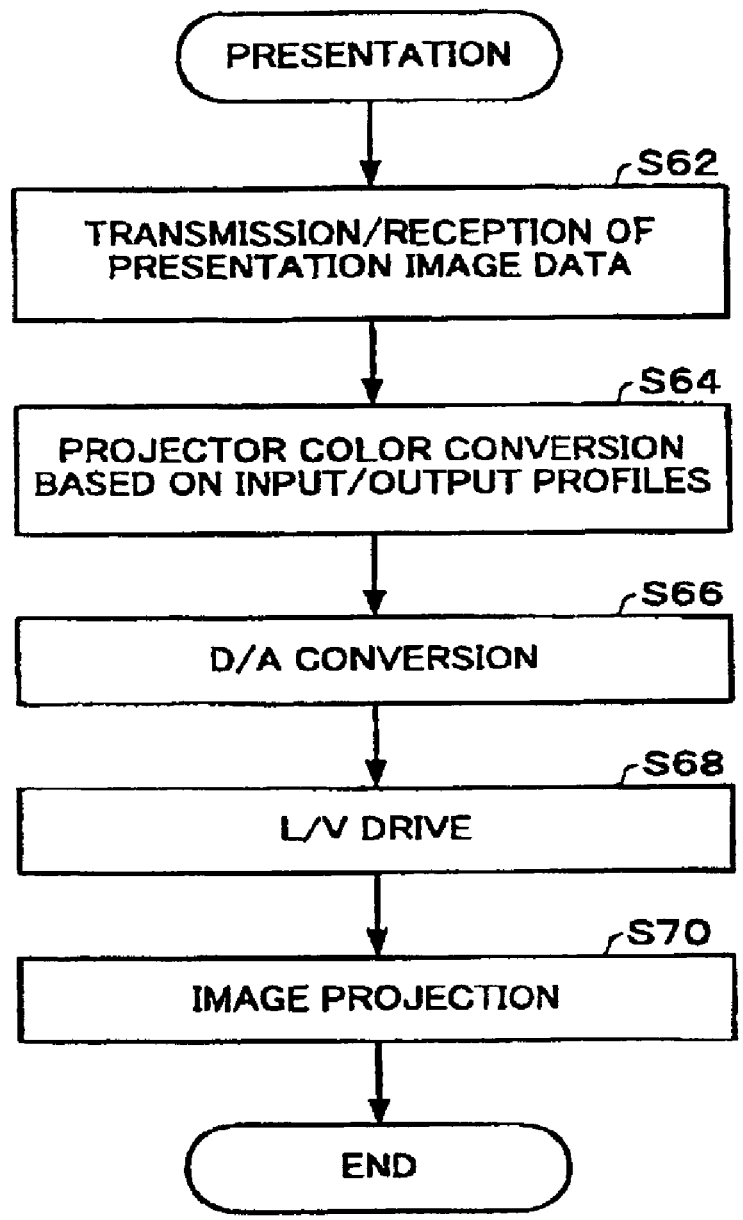
FIG. 8 is a flowchart illustrating the presentation on the side of receiver according to one embodiment of the present invention.

FIG. 8 is a flowchart illustrating the presentation according to one embodiment of the present invention.

In the projector 20-1 on the transmitter side, the A/D converter 110 first converts analog signals (R1, G1 and B1) for the presentation image into digital signals (R2, G2 and B2) and digital signals (R6, G6 and B6).

This presentation image data ((R6, G6 and B6) are transmitted from the projector 20-1 to the receiver side projector 20-2 (step S62).

The projector 20-1 inputs the presentation image data ((R6, G6 and B6) from the A/D converter 110 into the projector color converting section 120 while the projector 20-2 inputs the presentation image data ((R6, G6 and B6) received by the receiving/transmitting section 210 into the projector color converting section 120.

The projector color converting section 120 converts the RGB input/output profiles corrected on the calibration (step S4) so that the same color can be reproduced into digital RGB signals (R3, G3 and B3) for the projector 20 (step S64).

The D/A converter 18 converts the projector output digital RGB signals outputted from the projector color converting section 120 into analog RGB signals (R4, G4 and B4) (step S66).

The L/V driver 190 drives the liquid crystal light valve based on the analog RGB signals (step S68) and projects and displays the presentation image (step S70).

In this way, this embodiment corrects the input/output profiles reflecting the visual environments in the different locations to reproduce the ideal color. Thus, substantially the same image can be reproduced simultaneously at different locations without depending on the location whereat the projector 20 is disposed.

On presentation, the image processing can be carried out at increased speed by receiving/transmitting RGB data not required to be converted into the XYZ data. The projectors 20 may perform the presentation by receiving/transmitting the presentation data represented by the analog RGB signals or the presentation data represented by the XYZ type signals.

The image information relating to the ideal image color may be transmitted by the processor such as PC or the like to the respective projectors 20, rather than by the predetermined projector 20-1.

3. Technique of Conforming Colors of an Image Displayed at Different Locations to Colors of an Image Displayed at the Reference Location The technique of causing the colors of the image displayed at different locations to coincide with the color of the image displayed at the reference location will now be described. It is now assumed that each of the different locations includes a projector 20, a screen 10, a colored light sensor 60, a receiving/transmitting section 210 and PC.

The basic processing technique is similar to the technique of correcting the input/output profiles or the like to provide the ideal color, but different from the last-mentioned technique in connection with the calibration.

Figure 9:
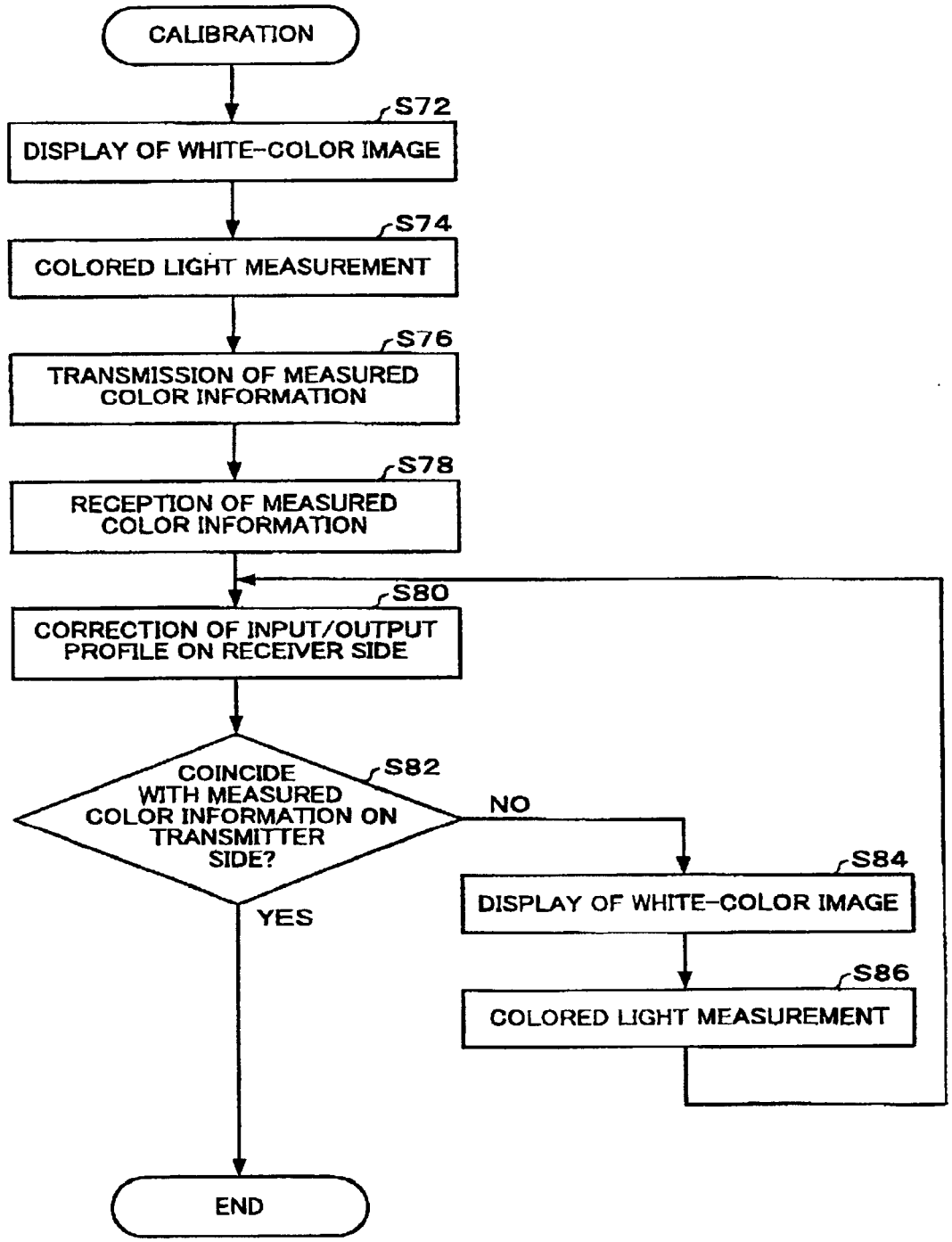
FIG. 9 is also a flowchart illustrating the calibration according to one embodiment of the present invention.

FIG. 9 is a flowchart illustrating the calibration according to one embodiment of the present invention.

As described, the white-color image may be received/transmitted on each calibration, but may previously be stored in the corresponding image display device since the white-color image is always invariable. It is assumed herein that the white-color image data used to display the white-color image has been previously stored in each of the projectors 20.

First of all, each of the projectors 20 projects and displays the white-color image based on the stored white-color image data (step S72).

The colored light sensor 60 connected to each of the projectors 20 measures the colored light (XYZ values) of the projected and displayed white-color image (step S74).

The receiving/transmitting section 210 connected to the projector 20-1 on the transmitter side sends the measured color information (XYZ values) including the measurements of the colored light sensor 60 toward the projector 20-2 on the receiver side (step S76).

The receiving/transmitting section 210 connected to the receiver side projector 20-2 receives the measured color information (XYZ values) (step S78).

The receiver side projector 20-2 corrects the input/output profiles and the like such that the measured color information (XYZ values) will coincide with the measured color information (XYZ values) received by the receiving/transmitting section 210 and reflecting the visual environment on the transmitter side (step S80).

The receiver side projector 20-2 judges whether or not the measured color information (XYZ values) measured by the colored light sensor 60 in the visual environment on the receiver side coincides with the measured color information (XYZ values) received by the receiving/transmitting section 210 and reflecting the transmitter side visual environment (step S82). If not so, the display of the white-color image (step S84), the measurement of the colored light (step S86) and the correction of the input/output profiles and the like (step S80) are repeated until the coincidence is attained.

In the calibration step, thus, the measured color information (XYZ values) from the colored light sensor 60, that is, the actual color observed by the observer becomes the same color at different locations.

In such a situation, the presentation image of the same color can simultaneously be viewed at both the receiver and transmitter sides by transmitting the presentation data from the transmitter side projector 20-1 to the receiver side projector 20-2.

This technique is superior to the first-mentioned technique of performing the correction to provide the aforementioned ideal color in respect to the high-speed processing, but the first-mentioned technique is superior in respect to the coincidence of the substantially completely reproduce color.

4. Explanation of Hardware

The hardware configuration of the aforementioned projectors 20 will be described.

Figure 16:
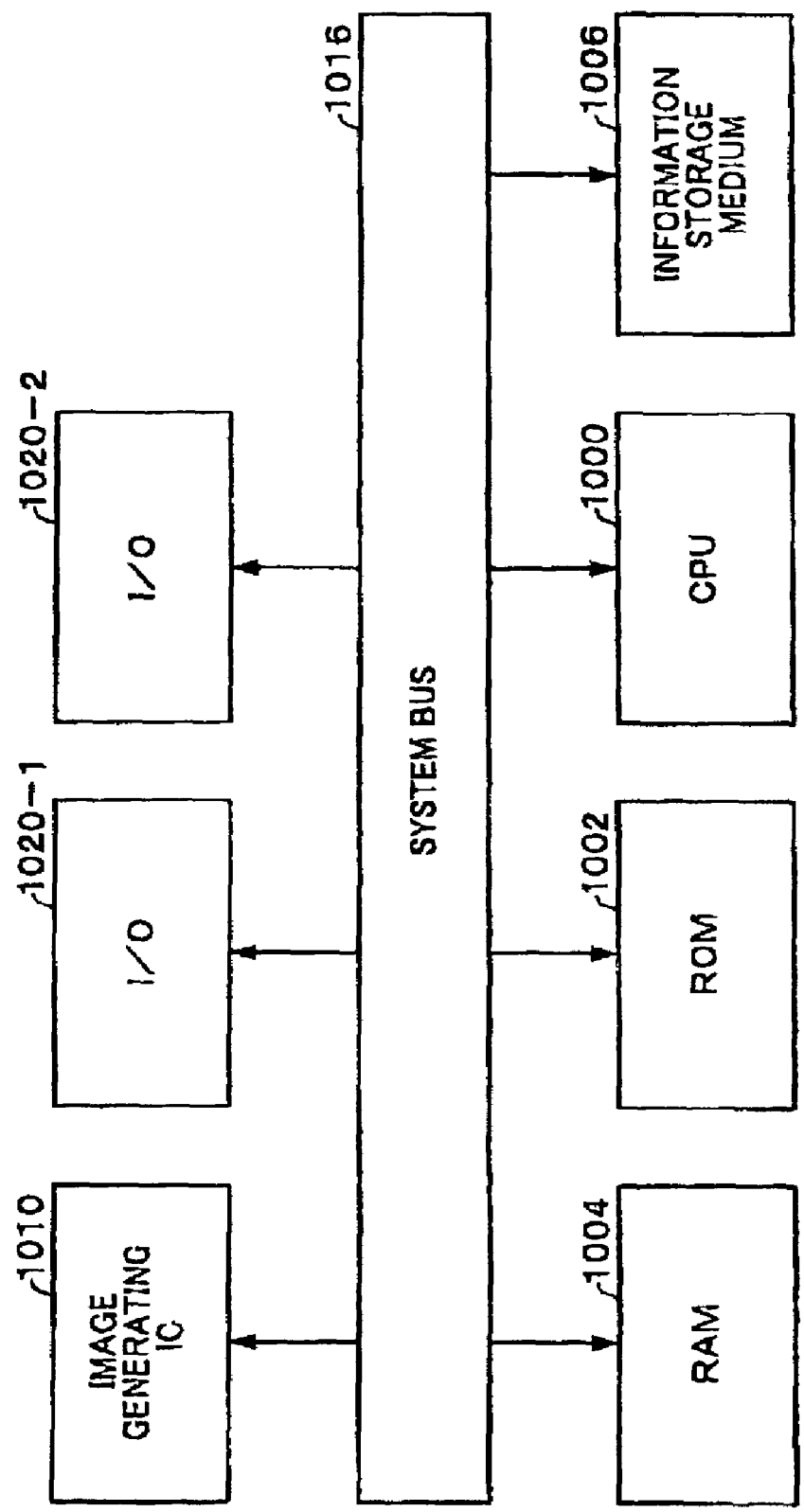
FIG. 16 is a diagram showing hardware configuration of a projector according one embodiment of the present invention.

FIG. 16 illustrates the hardware configuration of a projector 20 according to one embodiment of the present invention.

The system shown in FIG. 16 comprises CPU 1000, ROM 1002, RAM 1004, an information storage medium 1006, an image generating IC 1010 and input/output ports 1020-1, 1020-2, all of which are interconnected for data receiving/transmitting through a system bus 1016. The system is connected to various instruments such as PC, colored light sensor 60 and so on through the input/output ports 1020-1, 1020-2.

The information storage medium 1006 is to store a program, image data and so on.

The program stored in the information storage medium 1006 as well as a program stored in the ROM 1002 are used to cause the CPU 1000 to perform the control of the whole system and various data processings. The RAM 1004 is storage means used as a working area for the CPU 1000 and the like and to store given contents of the information storage medium 1006 and ROM 1002 and the computation results of the CPU 1000. Data structure having a logical configuration for implementing this embodiment will be build on the RAM 1004 or information storage medium 1006.

Various processings described in connection with FIGS. 1 to 15 are realized by the information storage medium 1006 stored a program for performing these processings, the CPU 1000 operated according to the program, the image generating IC 1010 and others. The processings carried out in the image generating IC 1010 and the like may be attained through any hardware circuit or the like or may be accomplished in software through the CPU 1000 or any general-purpose DSP or the like.

The information storage medium 1006 may be any of various forms such as CD-ROM, DVD-ROM, ROM, RAM and so on. The information storage medium 1006 may be either of contact type or non-contact type.

In place of the information storage medium 1006, the aforementioned functions may be realized by downloading a program for realizing the functions or the like from a host device or the like through a transmission path. In other words, the information for realizing the aforementioned functions may be embodied in carrier wave.

5. Modifications

The present invention is not limited to the above-described embodiments, but may be applied to any of various modifications.

Although FIG. 10 shows the technique of determining the coordinate values of complementary color pair using the inverse vector, any other technique not using the inverse vector may be used in the present invention. For example, a technique of determining the coordinate values of complementary color pair using the exterior division point.

Figure 12:
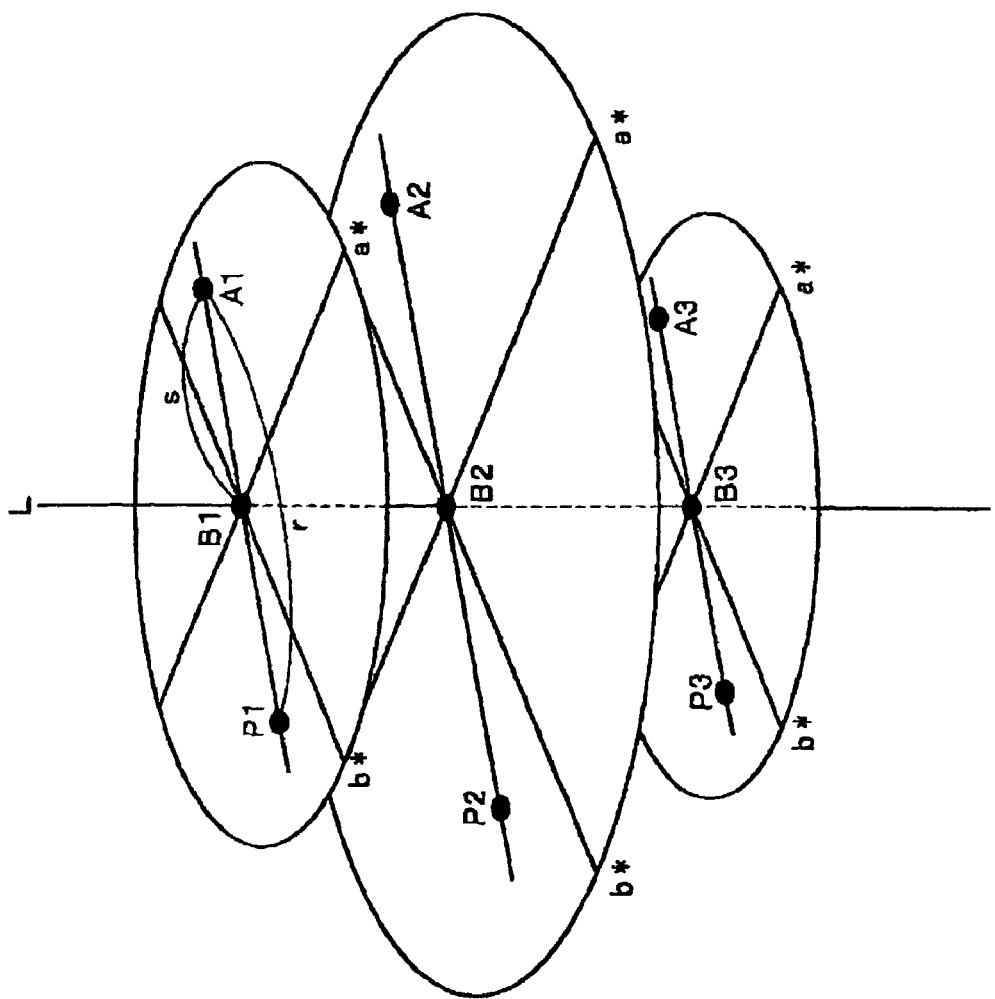
FIG. 12 is a schematic diagram showing the concept of exterior division point in the Lab space.

FIG. 12 is a schematic diagram showing the concept of exterior division point in the Lab space.

As in FIG. 10, it is assumed herein that in a predetermined a*-b* plane, the coordinate values of a white value in the actual presentation environment are A1 (a1, b1); the coordinate values of a point whereat the a*-b* plane intersects the L axis are B1 (a2, b2); and the coordinate values of the complementary color pair to be determined are P1 (a3, b3). If it is assumed that the distance between A1 and P1 is r, and the distance between A1 and B1 is s, r=2s. Since the coordinate values of A1 and B1 are known, the distance s can be determined.

In this case, the technique of external division point determines P1 (a3, b3) through the following formulas (7) and (8).

$$a3=(-s\times a1+2s\times a2)/(2s-s)=-a1+2\times a2 \quad (7)$$

$$b3=(-s\times b1+2s\times b2)/(2s-s)=-b1+2\times b2 \quad (8)$$

In such a manner, the coordinate values of complementary color pair can be determined using the external division point.

The present invention is not limited to such a one-to-one connection type network meeting system, but may be applied to any of various other image display systems. A case where the present invention is applied to a network meeting system which is one of the network type image display systems will be described.

Figure 14:
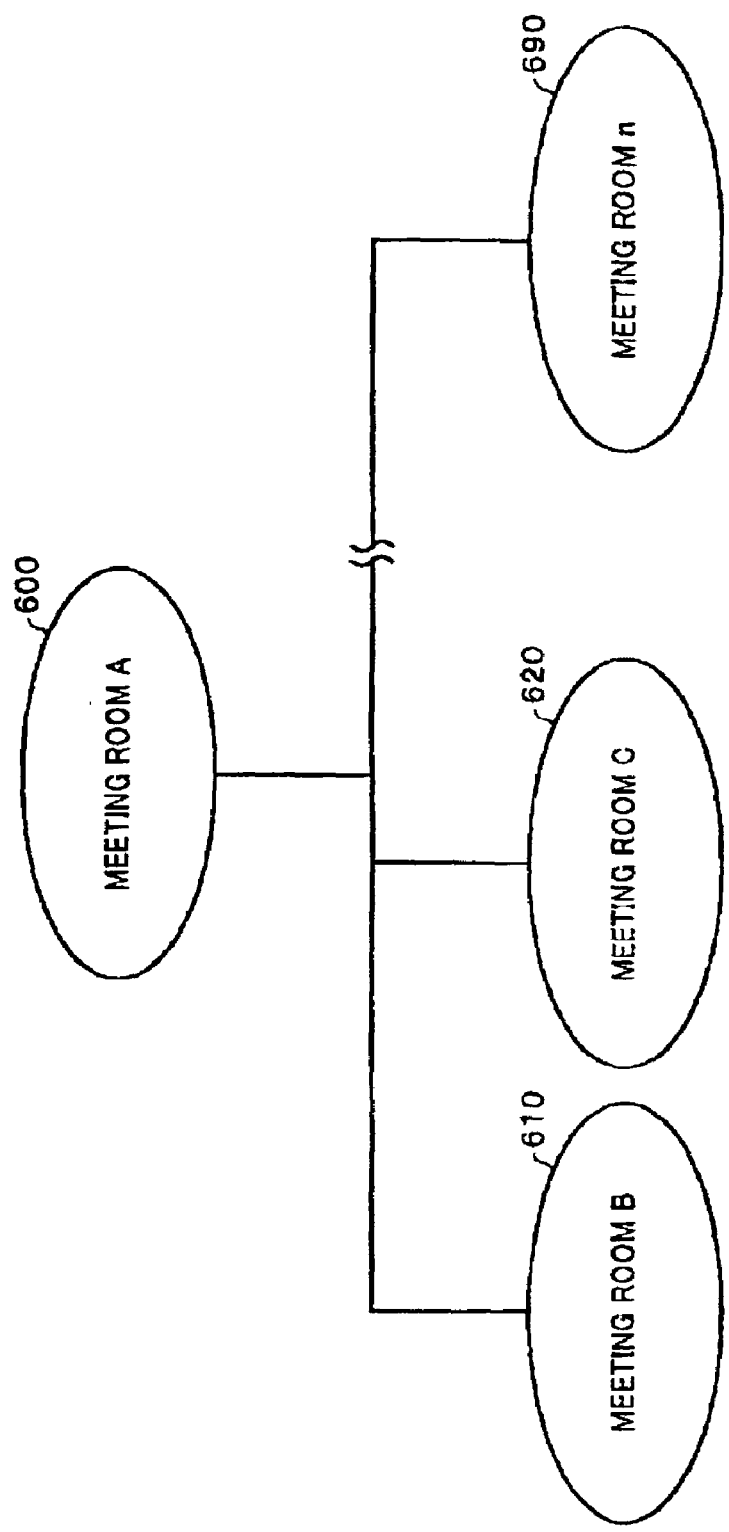
FIG. 14 is a schematic diagram showing a bus-connection type network meeting to which the present invention is applied.
Figure 15:
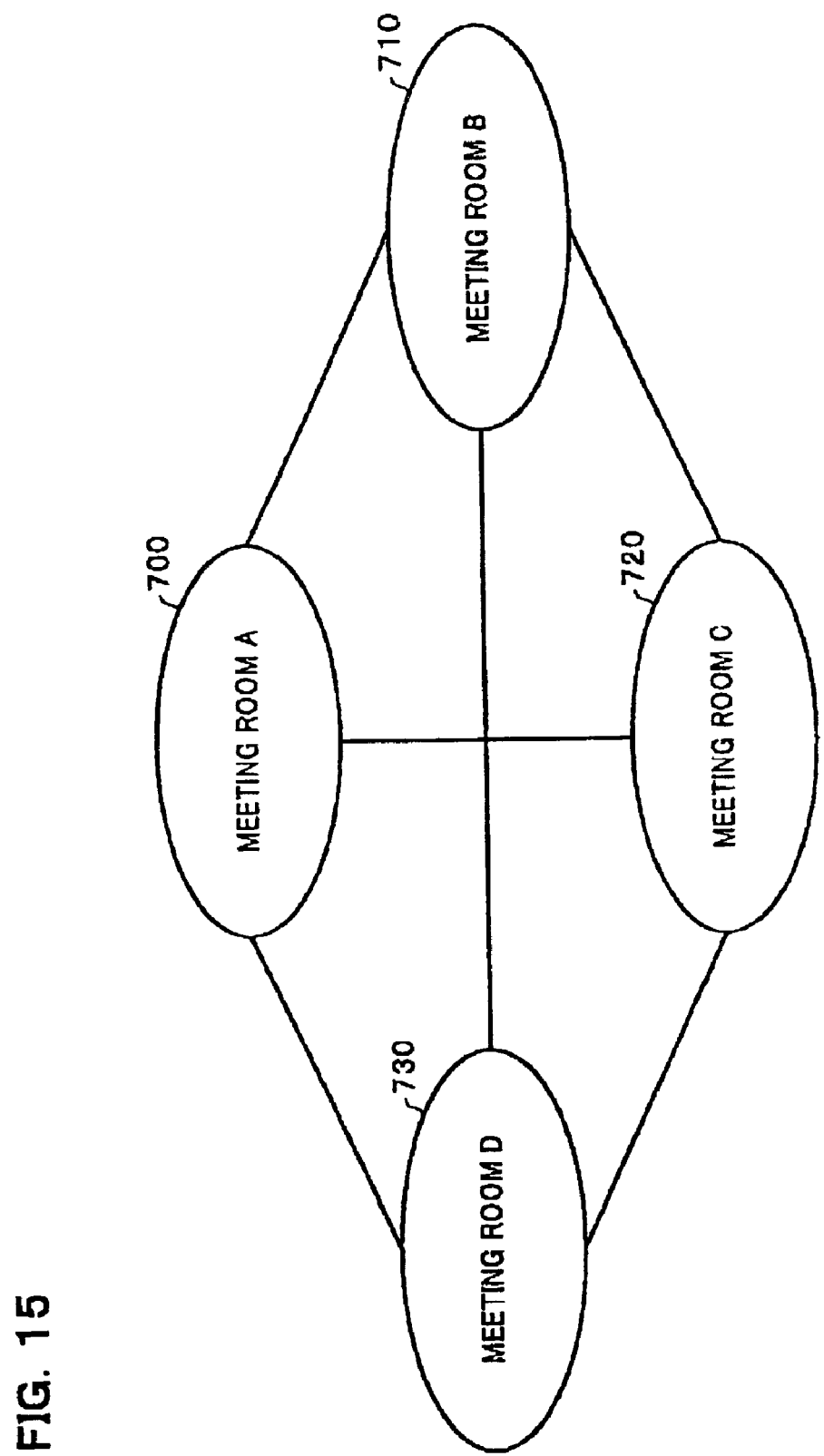
FIG. 15 is a schematic diagram showing an interconnection type network meeting to which the present invention is applied.

FIG. 14 schematically illustrates a bus connection type network meeting to which the present invention is applied while FIG. 15 schematically illustrates an interconnection type network meeting to which the present invention is applied.

As shown in FIG. 14, for example, the bus connection type network meeting form may include a meeting room A 600 as a reference location and other meeting rooms B 610, C 620 . . . n 690 in each of which the image must be regulated for the environment thereof different from that of the reference environment. The network meeting form always transmits the original image data and the visual environment information from the projector 20 of the meeting room A 600 to the respective projectors 20 of the meeting rooms B 610, C 620 . . . n 690.

In such a form, the projector 20 of the meeting room A 600 is provided with transmitter means for transmitting the original image data and the visual environment information in place of the aforementioned receiving/transmitting section 210. Each of the projectors 20 of the other meeting rooms B 610, C 620 . . . n 690 is provided with receiver means for receiving the original image data and the visual environment information.

By performing the receiving/transmitting of the original image data and so on in such a manner, the same image can be reproduced simultaneously at all the meeting rooms 600 to 690.

As shown in FIG. 15, if meeting rooms A 700, B 710, C 720 and D 730 are interconnected together, it is preferable to provide the receiving/transmitting section 210 such that any of the meeting rooms may have a reference environment.

Although the above embodiments are described as to the transmission of the reference environment information from a predetermined image display device to the individual image display devices at other different locations, the information may be transmitted from each of the individual image display devices at the different locations toward the image display device at the reference environment location.

If various image display devices are interconnected together, the image color in any of the individual image display devices may not be sufficiently regulated even though the reference environment information is transmitted from a predetermined image display device to each of the individual locations.

In such a case, the image display device at each of the different locations may transmit the visual environment information thereof to the image display device at the reference environment location. The image display device at the reference environment location may regulate the reference environment information so that each of the image display devices at the individual different locations can easily regulate the image color. The regulated reference environment information may then be transmitted to the other image display devices at the other different locations.

Thus, the display of image color in all the image display devices can surely be integrated even though various image display devices are interconnected together.

The present invention may be applied to any display means for displaying the presentation image other than the aforementioned projector means. In addition to a liquid crystal projector, such display means may include a projector using a digital micromirror device (DMD), a display device such as a cathode ray tube (CRT), a plasma display panel (PDP), a field emission display (FED), an electroluminescence (EL) display, or a direct view type liquid crystal display device. Note that DMD is the trade mark possessed by U.S. Texas Instrument.

Although the above embodiments are described as to the use of the same image display means both in the receiver and transmitter sides, the present invention may be applied to an image display system wherein different display means may be used, that is, a projector on the transmitter side and a large-sized monitor on the receiver side.

Although the aforementioned projectors 20 have been described as to the input/output of analog RGB signals, the present invention may be applied to an image display system wherein any image display means such as a projector for inputting/outputting digital image signals.

The function of the aforementioned projector image processing section 100 may be realized by a single image display device (e.g., a projector 20), but may be realized by a plurality of processors in a distributed fashion (e.g., through a distributed processing through projectors 20 and PCs).

The visual environment grasping means is not limited to the colored light sensor 60, but may be any of various other forms. For example, the visual environment grasping means may include one or combination of various other devices such as a colorimeter for reading the XYZ values or Lab values in the image display area, a meter for measuring the gamma value in the image display area, a meter for measuring the color temperature in the image display area, a color temperature measuring device such as a color temperature meter for measuring the color in the image display area, a sensor for measuring the ambient light and so on.

The visual environment to be grasped by the visual environment grasping means may include the ambient light (illumination light, natural light or the like), an object on which the image is to be displayed (e.g., display. wall, screen and the like) and so on. Although the screen 10 has been described as to the reflection type, it may be of transmission type. If the screen is of transmission type, it is preferred that the colored light sensor is a sensor for directly scanning the screen.

The data received/transmitted using the receiving/transmitting section 210 is not limited to the XYZ values. For example, the transmitter side device may send data indicating the gamma and color temperature in the reference environment to the receiver side device which in turn corrects the input/output profiles based on the received data indicating the gamma and color temperature as well as data indicating the gamma and color temperature in the receiver side environment.

Such a technique can similarly reproduce substantially the same color simultaneously at different locations.

Although the above-described embodiments are described as to the use of the Lab space as the color space, the present invention may be applied to L*u*v* space, L*C*h space, U*V*W* space or xyY space (which can also be referred to Yxy space).

Although the above embodiments are described as to the forward projection type projector, the present invention may use a backward projection type projector.

The aforementioned transmission path is not limited to the wire line such as the dedicated line 540, but may be a wireless line such as a satellite communication path.

The invention claimed is:

1. An environment-compliant image display system having a plurality of image display devices which are provided at different locations and display an image compliant with visual environment of a specific location in each of the different locations, each of the image display devices comprising:

projection means which projects an image onto a screen provided at the specific location when the image display device is provided at the specific location, projecting means projecting an image onto a screen provided at a location different from the specific location when the image display device is disposed at the different location;

visual environment grasp means which generates reference visual environment information indicating visual environment of the specific location by measuring at least one of color value, gamma and color temperature of the image projected onto the screen which is provided at the specific location when the image display device is disposed at the specific location, visual environment grasp means generating individual visual environment information indicating visual environment of a location which is different from the specific location by measuring at least one of color value, gamma and color temperature of the image projected onto the screen provided at the different location when the image display device is disposed at the different location;

transmission means which transmits reference visual environment information of the specific location to the other image display devices disposed at locations different from the specific location through a transmission path, when the image display device is disposed at the specific location;

reception means which receives the reference visual environment information through the transmission path, when image display device is disposed at a location different from the specific location; and correction means which corrects input/output characteristic data for display used by display means in each of the image display devices to display an image compliant with the visual environment of the specific location, based on the received reference visual environment information and individual visual environment information of a disposed location when the image display device is disposed at a location different from the specific location.

2. An environment-compliant image processing method for representing substantially the same colors as an image displayed at a reference location, the method comprising:

a reference image display step of displaying an image at the reference location; and an individual image display step of displaying an image at a location different from the reference location, wherein the reference image display step includes:

a projecting step of projecting an image onto a screen which is provided at the reference location;

a generation step of generating reference visual environment information indicating visual environment of the reference location, by measuring one of XYZ value and RGB value of an image projected onto the screen; and a transmission step of transmitting the reference visual environment information to a location different from the reference location through a transmission path, and wherein the individual image display step includes:

a projecting step of projecting an image onto the screen which is provided at a location different from the reference location;

a generation step of generating individual visual environment information indicating visual environment of a location different from the reference location, by measuring one of XYZ value and RGB value of an image projected onto the screen;

a reception step of receiving the reference visual environment information; and a correction step of correcting input/output characteristic data for display, based on the received reference visual environment and the individual visual environment information.

3. The image processing method as defined in claim 2, wherein in the individual image display step, the projecting step of projecting an image onto the screen which is provided at the different location based on the input/output characteristic data, the generation step of generating the individual visual environment information and the correction step are repeatedly performed until the individual visual environment information coincides with the reference visual environment information.

4. A program embodied on an information storage medium or in a carrier wave, using a plurality of image display devices provided at different locations to display an image compliant with visual environment of a specific location at each of the different locations, the program causing a computer to implement:

projection means which projects an image onto a screen which is provided at the specific location when the computer is disposed at the specific location, projection means projecting an image onto the screen which is provided at a location different from the specific location, when the computer is disposed at a location different from the specific location;

visual environment grasp means which generates reference visual environment information indicating environmental information of the specific location by measuring one of XYZ value and RGB value of an image projected onto the screen which is provided at the specific location when the computer is disposed at the specific location, visual environmental grasp means generating individual visual environment information indicating visual environment of the different location by measuring one of XYZ value and RGB value of the projected image when the computer is disposed at the different location;

means which makes transmission means transmit the reference visual environment information of the specific location to part of the image display devices disposed at locations different from the specific location through a transmission path, when the computer is disposed at the specific location;

means which makes reception means receive the reference visual environment information through the transmission path, when the computer is disposed at a location different from the specific location; and correction means which corrects input/output characteristic data for display to display an image compliant with the visual environment of the specific location, based on the received reference visual environment information and the individual visual environment information of a disposed location of the computer when the computer is disposed at a location different from the specific location.

* * * * *

UNITED STATES PATENT AND TRADEMARK OFFICE
CERTIFICATE OF CORRECTION

| | | |
|---|---|---|
| PATENT NO. | : 7,061,547 B2 | Page 1 of 1 |
| APPLICATION NO. | : 10/031441 | |
| DATED | : June 13, 2006 | |
| INVENTOR(S) | : Osamu Wada | |

It is certified that error appears in the above-identified patent and that said Letters Patent is hereby corrected as shown below:

On Title Page,
Please delete the following:

Item (54)   IMAGE DISPLAYING SYSTEM OF ENVIRONMENT-ADAPTIVE TYPE, IMAGE PROCESSING METHOD AND PROGRAM and Replace with:

Item (54)   ENVIRONMENT-COMPLIANT IMAGE DISPLAY SYSTEM, IMAGE PROCESSING METHOD AND PROGRAM Signed and Sealed this Nineteenth Day of December, 2006

JON W. DUDAS
*Director of the United States Patent and Trademark Office*